United States Patent [19]
Chronister

[11] Patent Number: 5,193,573
[45] Date of Patent: Mar. 16, 1993

[54] BALL VALVE HAVING REPLACEABLE SEALS UNDER FULL SERVICE PRESSURE

[76] Inventor: Clyde H. Chronister, 6115 Bermuda Dunes, Houston, Tex. 77069

[21] Appl. No.: 898,367

[22] Filed: Jun. 15, 1992

[51] Int. Cl.⁵ .............................................. F16K 5/06
[52] U.S. Cl. .................................... 137/315; 251/86; 251/315
[58] Field of Search .................. 137/315; 251/315, 86

[56] References Cited

U.S. PATENT DOCUMENTS

| | | | |
|---|---|---|---|
| 3,580,268 | 5/1971 | Shafer | 251/315 X |
| 4,140,149 | 2/1979 | Laignel et al. | 251/315 X |
| 4,273,152 | 6/1981 | Freeman | 137/315 |
| 4,372,532 | 2/1983 | Yawamoto et al. | 251/315 X |
| 4,512,360 | 4/1985 | Chronister | 137/326 |
| 4,739,792 | 4/1988 | Tomberg | 137/315 |

*Primary Examiner*—John C. Fox
*Attorney, Agent, or Firm*—Fulbright & Jaworski

[57] ABSTRACT

A housing having an inlet and outlet and seal ring sealably positioned in each of the inlet and outlet and movable longitudinally. A ball valve element positioned in the housing between the seal rings and having a tubular member rotatable on trunnions. A movable seat ring is connected to opposite sides of the tubular member by fastening means inside of the seat ring and the ring is removable through an openable closure flange.

8 Claims, 5 Drawing Sheets

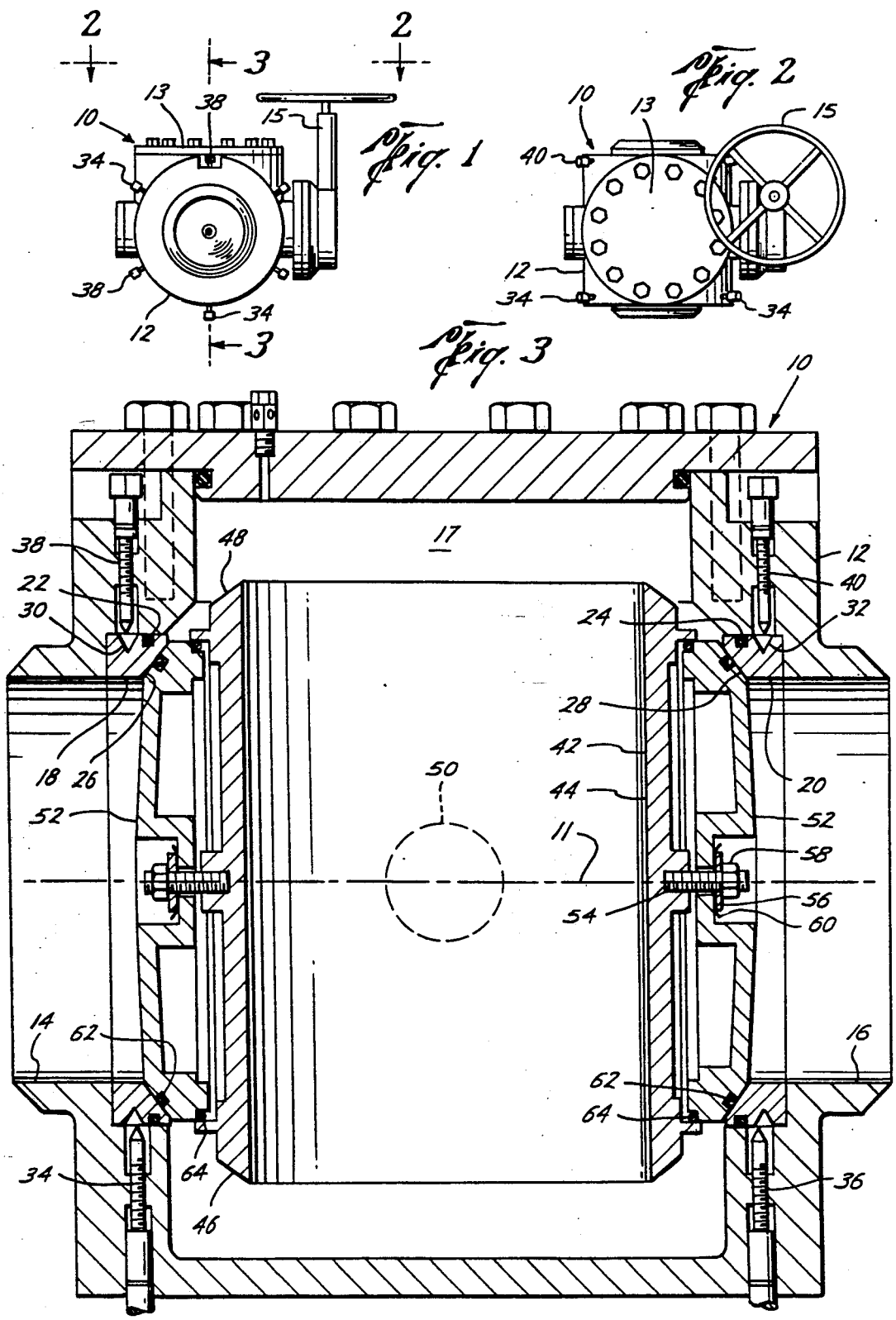

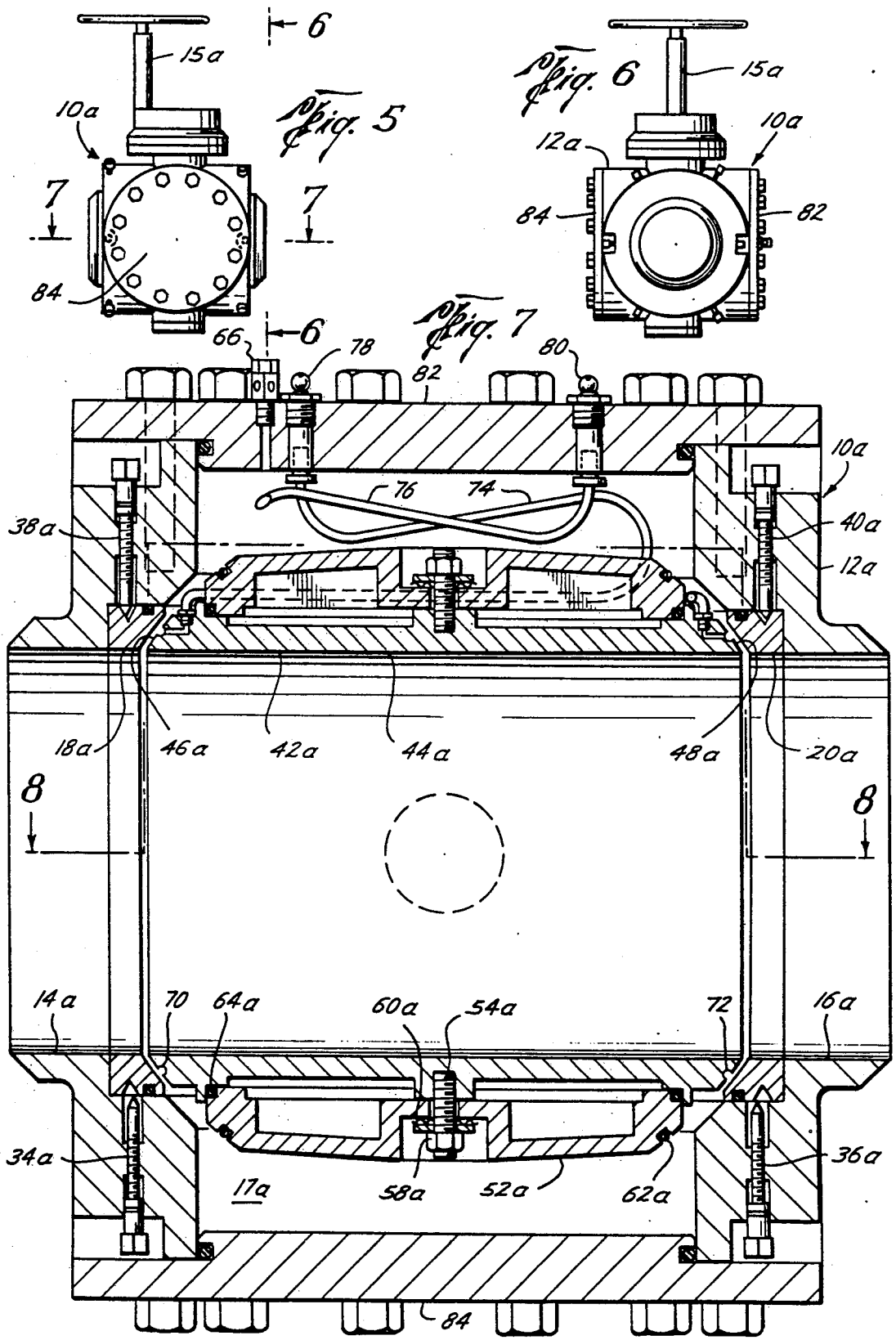

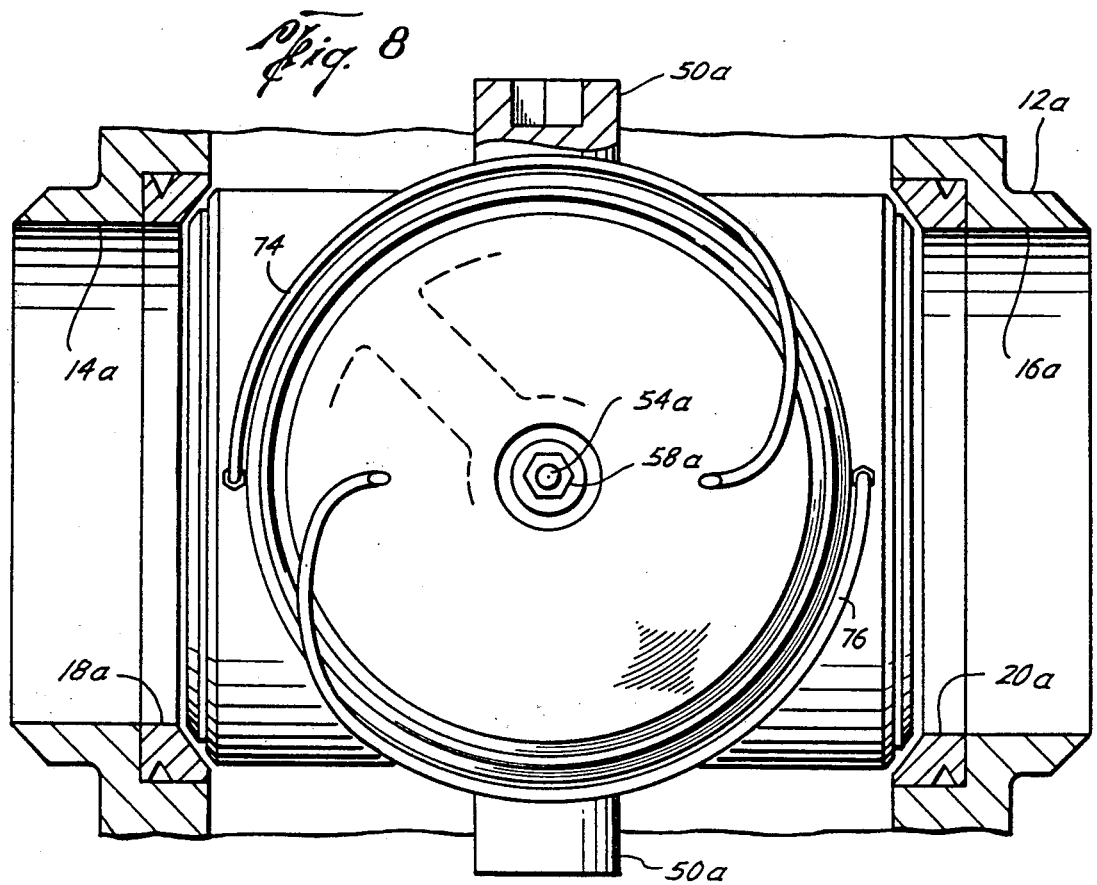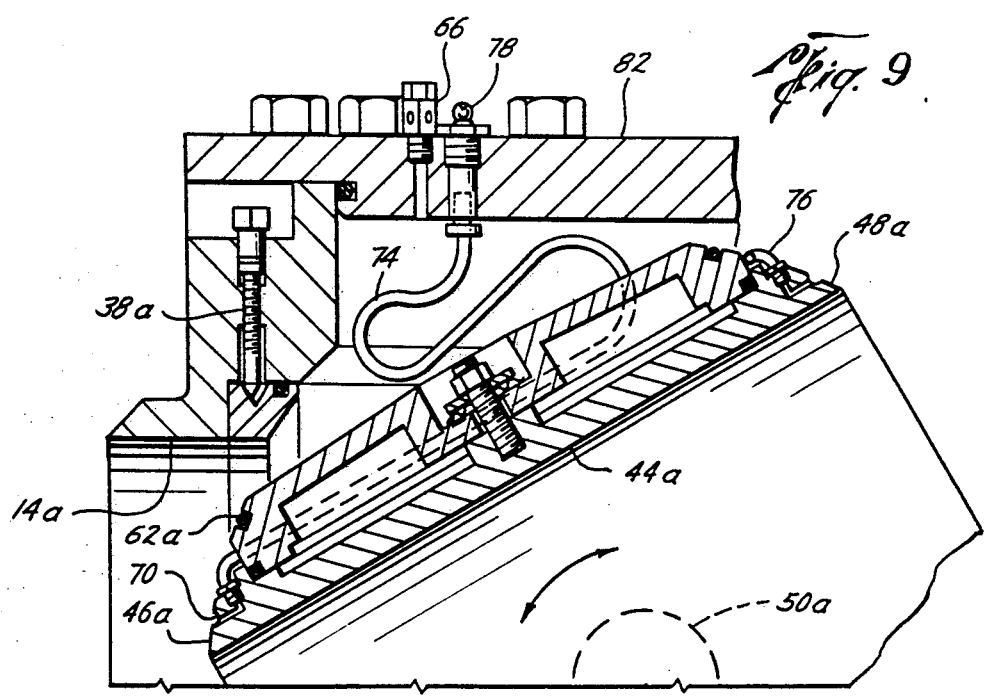

BALL VALVE HAVING REPLACEABLE SEALS UNDER FULL SERVICE PRESSURE

BACKGROUND OF THE INVENTION

The present invention relates to a ball valve having replaceable seals which may be repaired or replaced while the valve remains in use. It is known from my earlier U.S. Pat. No. 4,512,360 to provide a ball valve with replaceable seals which can be repaired or replaced without removing the valve from the line.

The present invention is directed to various improvements in a ball valve and in particular directed to providing a seat ring having seals which can more easily be replaced and repaired. In the present valve the seals can be replaced while the valve remains in service under pressure. This is an important advantage over ball valves that require the ball valve element to be removed in order to change the seals.

SUMMARY OF THE INVENTION

The present invention is directed to a ball valve having replaceable seals and includes a housing having a longitudinal axis and an inlet and an outlet and a seal ring sealably positioned in the housing adjacent each of the inlet and outlet. The housing includes an openable closure flange. Means are provided extending between the seal rings and the outside of the housing for longitudinally moving the seal rings. A ball valve element is positioned in the housing between the seal rings and includes a tubular member having a sealing face on each end for providing flow therethrough when the tubular member is aligned between the seal rings. Trunnions are positioned on opposite sides of the tubular member perpendicular to the longitudinal axis for rotating the ball element. A movable seat ring is connected to opposite sides of the tubular member by fastening means inside of the seat ring and the seat ring is removable through the openable closure flange.

Still a further object of the present invention is wherein the seat rings are connected to the tubular member by a single bolt in the center of the ring and the bolt is perpendicular to the longitudinal axis. Preferably a nut is provided on each bolt and a spring is provided between the nut and each seat ring for allowing the seat rings to float.

Yet a further object is wherein the seat rings include an outer resilient seal in their outer ends for seating on the seal ring and an inner seal between the seat rings and the tubular member, and the diameter of the inner seal is greater than the diameter of the outer seal allowing the service pressure to move the seat rings toward the seal rings.

Still a further object is the provision of a sealant outlet in the sealing faces of the tubular member extending to the outside of the housing for providing a sealant to the sealing faces.

A further object of the present invention is wherein the means for moving the seal rings includes means for moving the seal rings towards and away from the ball valve element. In one embodiment the means includes a V-shaped groove in the outer periphery of each ring and at least two spaced screws positioned to engage opposite sides of the groove.

In one embodiment two opposing openable flanges are provided on the valve housing for simultaneously repairing the two seal rings while the valve is in the open position.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 1 is an elevational view of one embodiment of the ball valve of the present invention, FIG. 2 is a view taken along the line 2—2 of FIG. 1, FIG. 3 is an enlarged cross-sectional view taken along the line 3—3 of FIG. 1, FIG. 5 is a side elevational view of another embodiment of the ball valve of the present invention, FIG. 6 is a cross-sectional view taken along the line 6—6 of FIG. 5, FIG. 7 is an enlarged cross-sectional view taken along the line 7—7 of FIG. 5, FIG. 8 is a fragmentary cross-sectional view taken along the line 8—8 of FIG. 7, FIG. 9 is a fragmentary cross-sectional view similar to FIG. 7 illustrating the ball valve element in an intermediate position.

DESCRIPTION OF THE PREFERRED EMBODIMENT

Figure 4:
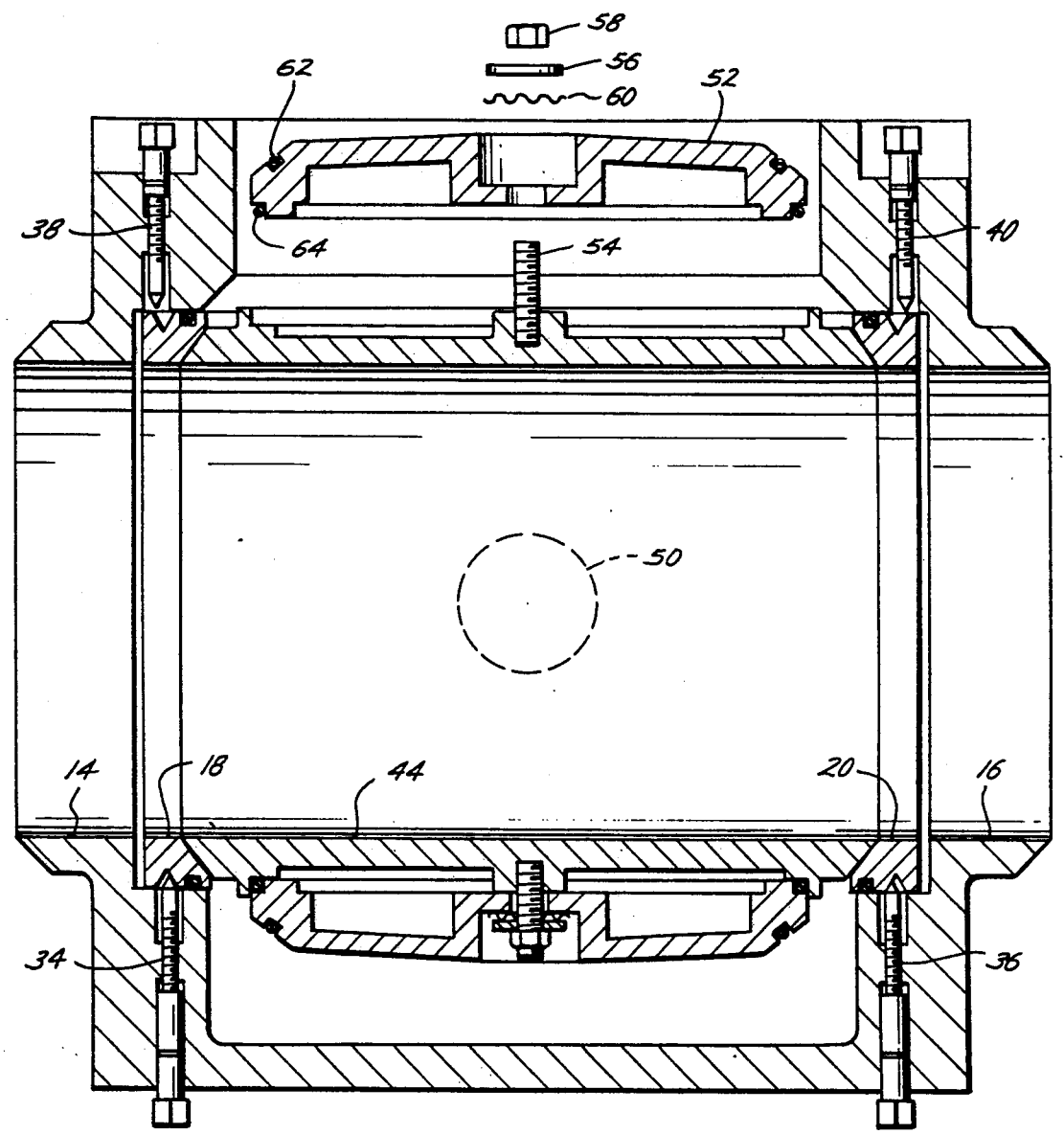
FIG. 4 is a cross-sectional view similar to FIG. 3 but showing one of the seals being replaced.

Referring now to the drawings, particularly to FIGS. 1-3, the ball valve of the present invention is generally indicated by the reference 10 and includes a valve body or housing 12 having an openable closure flange 13 and may be operated by any suitable valve operator such as wheel actuated operator 15.

As best seen in FIG. 3, the housing 12 includes aligned openings 14 and 16, either one of which may be an inlet such as 14 and either one of which may be an outlet such as 16. A seat ring 18 and 20 is positioned adjacent the inlet 14 and outlet 16, respectively, and sealably engages the housing 12 by seals 22 and 24, respectively. The seat rings 18 and 20 are movable longitudinally in the housing 12 and have sealing surfaces 26 and 28, respectively.

Means are provided extending between the seal rings 18 and 20 and the outside of the housing 12 for longitudinally moving said seal rings 18 and 20 in two directions. Various types of mechanisms may be provided, and as shown in FIGS. 1-3 the seal rings 18 and 20 may include a V-groove 30 and 32, respectively. A first set of adjusting screws are provided such as screws 34 and 36 sealingly extend through the housing 12 for moving the seat rings 18 and 20 inwardly as the screws engage one side of the V-grooves 30 and 32, respectively. Another set of adjusting screws 38 and 40 are provided, longitudinally offset from the adjusting screws 34 and 36, respectively for engaging the other side of the V-shaped grooves 30 and 32, respectively for retracting the seat rings 18 and 20 from the center of the housing 12, as will be described in greater detail hereinafter.

A ball valve element 42 is positioned in a cavity 17 of the housing 12 between the seal rings 18 and 20 and includes a tubular member 44 having a sealing face 46 and 48 at opposite ends. The tubular member 44 provides flow therethrough when the tubular member 44 is aligned along the longitudinal axis 11 between the seal rings 18 and 20.

Trunnions 50 are positioned on opposite sides of the tubular member 44 perpendicular to the longitudinal axis 11 for rotating the ball element 42. A movable seat ring 52 is connected to opposite sides of the tubular member and spaced 90° from the trunnions 50 by fastening means inside of the seat rings 52 and the seat rings 52 are removable through the closure flange 13 when it is opened. Preferably the fastening means includes a single bolt 54, a washer 56 and nut 58 with a spring 60 positioned between the rings 52 and the washer 56 for yieldably urging the seat rings 52 against the tubular member 44. Thus, the springs 60 serve to allow the seat rings 52 to float.

The floating seat rings 52 include an outer resilient seal 62 for sealing against the seat rings 18 and 20 and the seat rings 52 include an inner resilient seal 64 between the seat rings 52 and the tubular member 44. The diameter of the inner seal 64 is greater than the diameter of the outer seal 62. Thus, as best seen in FIG. 3 when the seat rings 52 are in contact with the seat rings 18 and 20 the service pressure in the inlet 14 and outlet 16 act on the seals 64 to seal the seat rings 52 tighter against the seat rings 18 and 20.

In operation, the valve operator 15 may be actuated to rotate the ball valve element 44 to place it in alignment with the seat rings 18 and 20 and fluid will thus flow from the inlet 14 through the tubular member 44 and out the outlet 16 whether the seat rings 18 and 20 are in a sealing relationship with the faces 46 and 48 or not. That is, while fluid may flow into the cavity 17 of the housing 12 no seals are required while the valve 10 is in the open position. In fact, preferably the seat rings 18 and 20 are retracted away from the tubular member 42 by the adjusting screws 38 and 40 and placed in a position shown in the embodiment of FIG. 7, which will be discussed hereinafter. In the event it is desired to shut off the valve 10, the valve operator 15 is actuated to rotate the ball element 44 90° to a position as best seen in FIG. 3. With the seat rings 18 and 20 retracted there will be less likelihood of damage to the seat rings 18 and 20 and the resilient seals 62 of the seat rings 52. And as soon as the ball element 42 is in the closed position (FIG. 3), service pressure at the inlet 14 and outlet 16 will act on the larger diameter seals 64 to force the floating seat rings 52 into a sealing relationship with the seat rings 18 and 20, respectively.

In the event it is desired to change out either or both of the seals 62 and 64 on the seal rings 52, the valve 10 is rotated to the open position as best seen in FIG. 4 and the adjusting screws 34 and 36 are actuated to move the seat rings 18 and 20 into a sealing engagement with the faces 46 and 48. Then pressure can be released from the body cavity 17, but the product can remain in the line. This allows the removable top flange 13 to be removed, the top seal ring 52 is removed, and repaired and replaced without shutting down the pipeline. In addition, since the seat rings 18 and 20 are in a sealing relationship with the tubular member 42, little fluid in the valve cavity 17 will be lost.

After the top seal ring 52 has been replaced, the ball valve element 42 is rotated 180° moving the lower seal ring 52 to the top where it may be replaced and/or repaired. After this, the seat rings 18 and 20 may again be retracted away from the tubular member 44 to place the valve 10 in immediate condition for moving to the closed position if required.

Referring now to FIGS. 5–10, another embodiment of the ball valve for the present invention is shown wherein like parts are numbered similar to those in FIGS. 1–4 with the addition of the suffix "a". While the embodiment of FIGS. 1–4 may be satisfactory, in some cases it may be difficult to obtain a sufficient seal between the seat rings 18 and 20 and the sealing faces 46 and 48 of the tubular member 44, particularly in the case where the fluid flowing through the valve 10 is a gas. Therefore, one of the features of the embodiment of FIGS. 5–10 is the provision of a sealant which may be injected into the interface between the seat rings and the faces on the tubular member for insuring a better seal. Another feature of this embodiment is the provision of having two openable side flanges on the valve whereby the seal rings may be simultaneously repaired and/or replaced without rotating the ball element.

Figure 10:
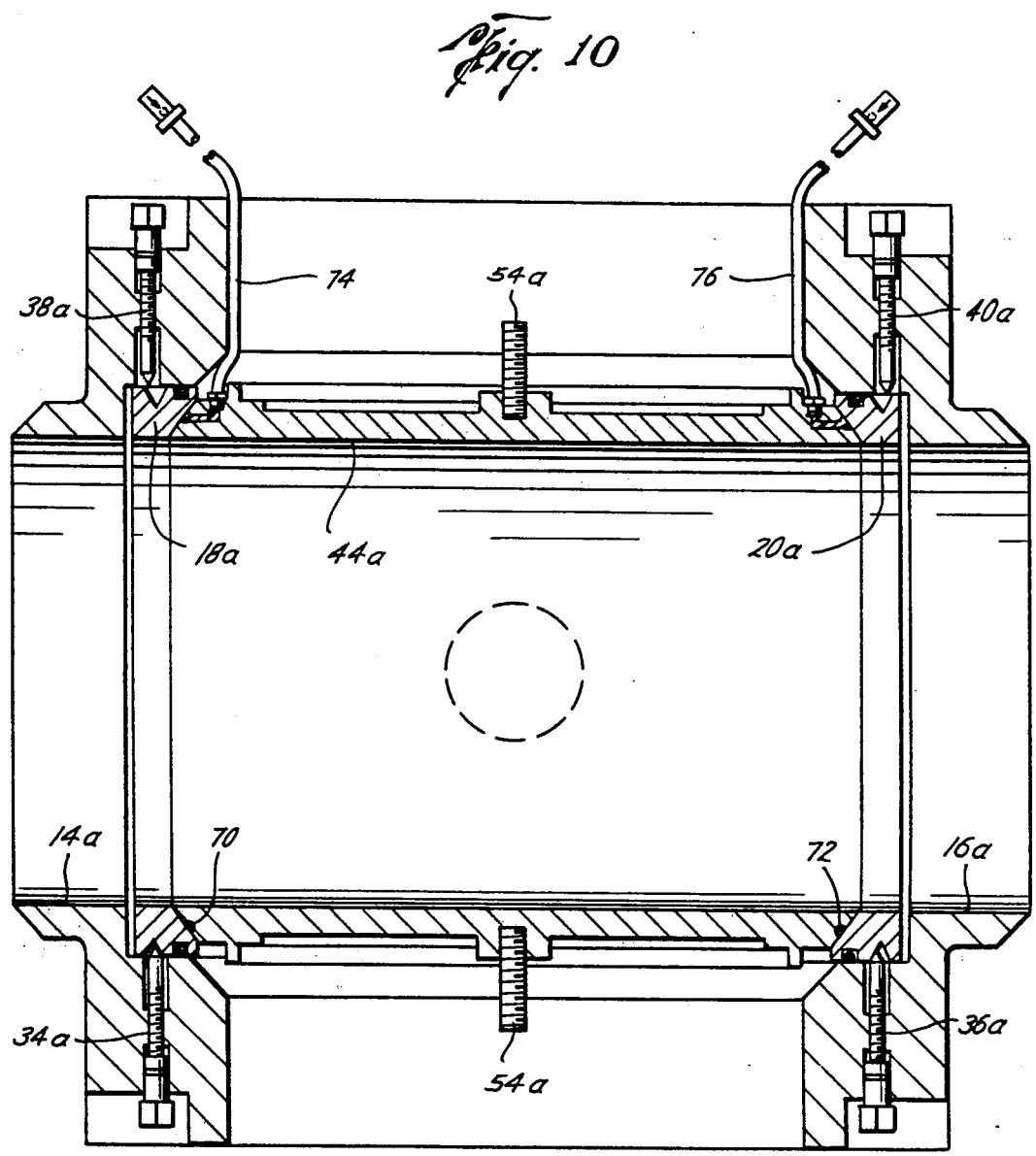
FIG. 10 is an enlarged cross-sectional view similar to FIG. 7 but showing the seals being replaced.

Referring now particularly to FIG. 7 the ball valve element 42a is shown in the open position with the seat rings 18a and 20a normally retracted. It is to be noted that the sealing faces 46a and 48a include a circular groove 70 and 72, respectively. A lubricant line 74 and 76 are connected to the grooves 70 and 72, respectively and in turn are releasably connected to sealant fittings 78 and 80. Thus, when it is desired to change the seals 52a the ball valve element is rotated to the open position as shown, and the seat rings 18a and 20a are moved by the adjusting screws 34a and 36a into engagement with the sealing faces 46a and 48a of the tubular member 44a (FIG. 10). Sealant is then injected into the fittings 78 and 80 to provide a gas tight seal. Vent 66 can be opened to insure that the seal between seat rings 18a and 20a with the tubular member 44a are properly sealed prior to removing flanges 82 and 84 for changing out the seals 52a. As best seen in FIGS. 8 and 9 the lines 74 and 76 are suitably coiled to have sufficient length to allow the valve 10 to move from the open position as best seen in FIG. 7 towards the partially closed position as shown in FIG. 9 and into a full closed position (not shown).

The valve shown in FIGS. 5–10 includes openable side closure flanges 82 and 84. As best seen in FIG. 10, the flanges 82 and 84 have been removed, and both of the seal rings 52a have been removed for repair and/or replacement while the valve 10a is in the open position and is still in service.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts may be made without departing from the spirit of the invention and the scope of the appended claims.

What is claimed is:

1. A ball valve having replaceable seals comprising,
   a housing having a longitudinal axis and having an inlet and an outlet and a seal ring sealably positioned in the housing adjacent each of the inlet and the outlet, said seal rings movable longitudinally in the housing and having a sealing surface, said housing including an openable closure flange,
   means extending between said seal rings and the outside of the housing for longitudinally moving said seal rings,
   a ball valve element positioned in the housing between the seal rings and includes a tubular member having a sealing face on each end for providing flow-therethrough when the tubular member is aligned between the seal rings, trunnions positioned on opposite sides of the tubular member perpendicular to the longitudinal axis for rotating the ball element, and a movable seat ring connected to opposite sides of the tubular member by releasable fastening means inside of the seat ring, said seat rings removable through the open closure flange.

2. The valve of claim 1 wherein each of the seat rings are connected to the tubular member by a single bolt in the center of the ring and the bolt is perpendicular to the longitudinal axis.

3. The valve of claim 2 including a nut on each bolt and a spring between the nut and each seat ring for allowing the seat ring to float.

4. The valve of claim 1 wherein said seat rings include an outer resilient seal in their outer ends for seating on the seal ring and an inner seal between the seat rings and the tubular member, and the diameter of the inner seal is greater than the diameter of the outer seal.

5. The valve of claim 1 including a sealant outlet in the sealing faces of the tubular member extending to the outside of the housing for providing a sealant for sealing against service pressure.

6. The valve of claim 1 wherein the means for moving said seal rings include means for moving the seal rings toward and away from the ball valve element.

7. The valve of claim 6 wherein said means for moving the seal rings include a V-shaped groove in the outer periphery of each ring and at least two spaced screws positioned to engage opposite sides of the V-groove.

8. The valve of claim 1 wherein the housing includes opposing openable closure flanges.

* * * * *